L. KAPPERTZ.
AUTOMOBILE RADIATOR.
APPLICATION FILED APR. 20, 1917.
1,321,052.
Patented Nov. 4, 1919.
2 SHEETS—SHEET 1.
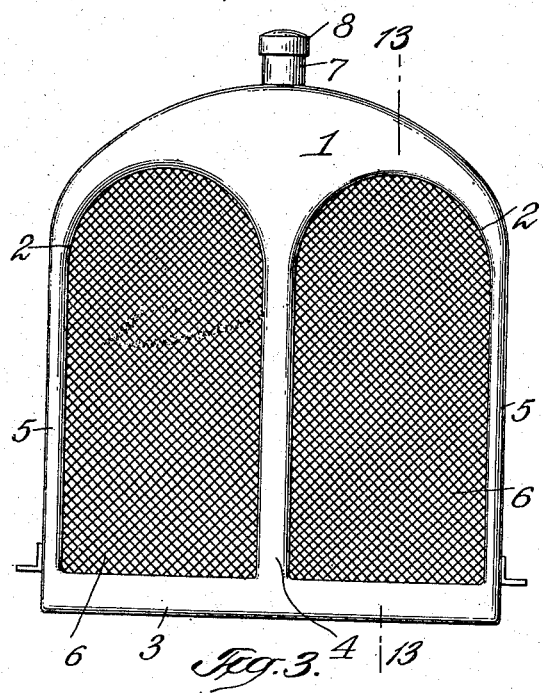
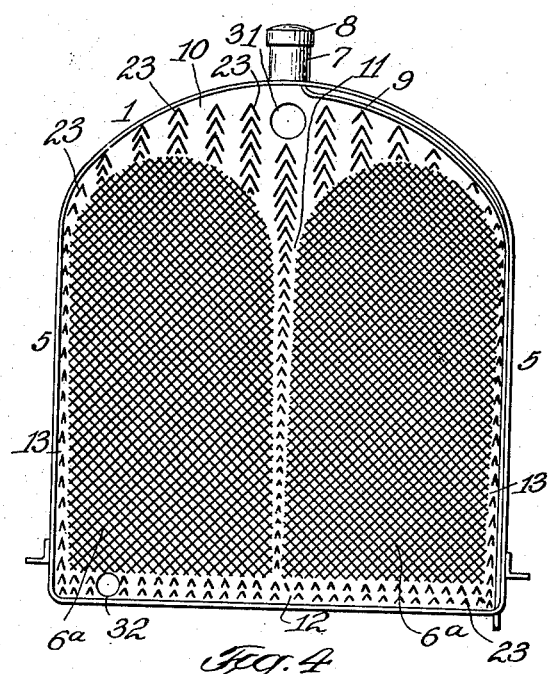
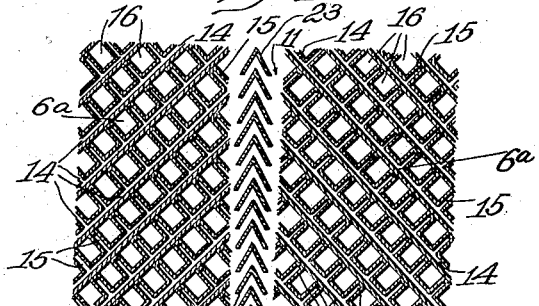
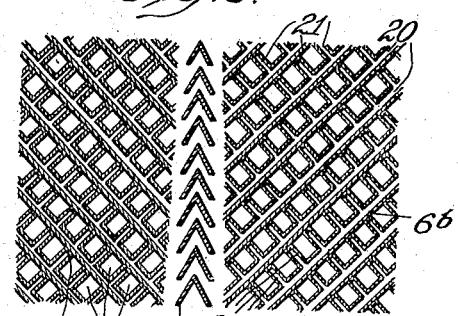
INVENTOR
Leo Kappertz
BY
Fred D. Casker
ATTORNEY L. KAPPERTZ.
AUTOMOBILE RADIATOR.
APPLICATION FILED APR. 20, 1917.
1,321,052.
Patented Nov. 4, 1919.
2 SHEETS—SHEET 2.
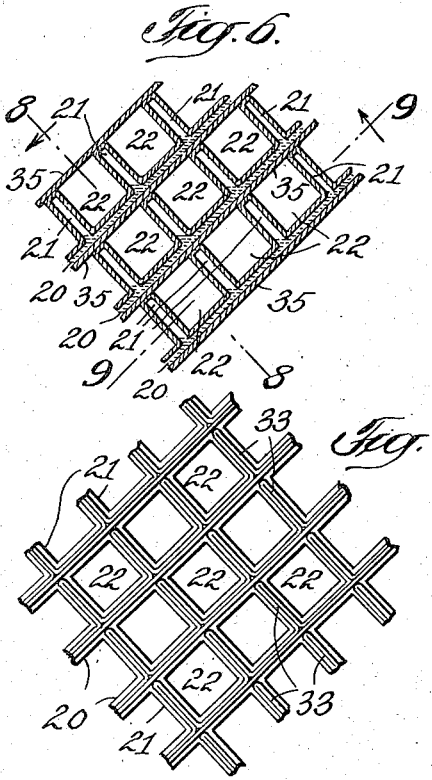
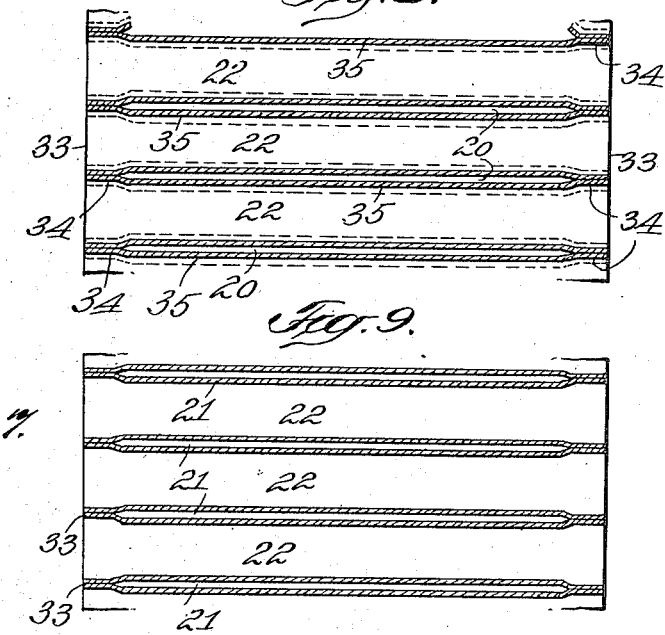
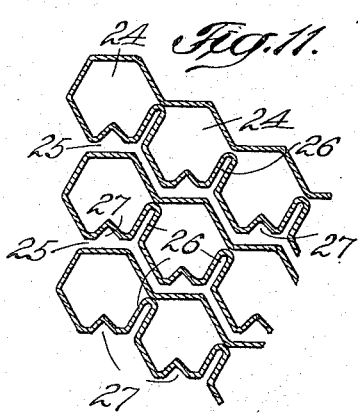
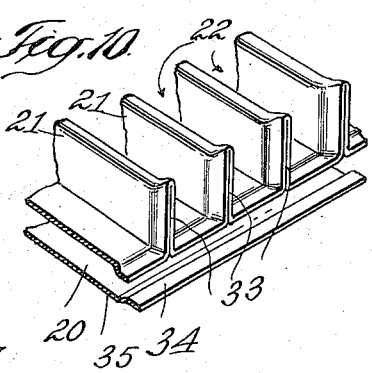
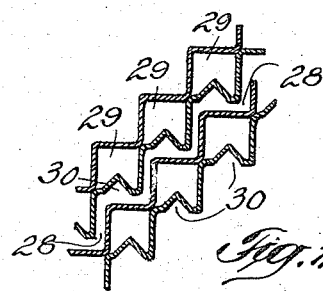
INVENTOR
Leo Kappertz.
BY
Fred E. Fisken
ATTORNEY

UNITED STATES PATENT OFFICE.

LEO KAPPERTZ, OF MORRISTOWN, NEW JERSEY.

AUTOMOBILE-RADIATOR.

1,321,052.

Specification of Letters Patent.

Patented Nov. 4, 1919.

Application filed April 20, 1917. Serial No. 163,352.

*To all whom it may concern:*

Be it known that I, LEO KAPPERTZ, a citizen of the United States, and resident of Morristown, in the county of Morris and State of New Jersey, have invented certain new and useful Improvements in Automobile-Radiators, of which the following is a specification, reference being had therein to the accompanying drawing.

The invention refers to an automobile radiator wherein water or other cooling fluid is employed. Some objects, among many that might be mentioned, are to secure a greatly increased efficiency through an improved water distribution and circulation system, also to reduce the cost of manufacture and thus provide a radiator that is economical as well as simple in operation, and further to provide a novel construction that will prevent rupture or injury by freezing.

It consists in a radiator having duplex vertical sections of nests or banks of air tubes alongside of each other, between and outside of which are main water channels through which the water flows in one direction or the other to produce the best results in cooling. It consists further in a radiator having an air-trap; a radiator of the cellular or honeycomb type affording a multitude of air passages in which the air is acted upon by a cooling liquid, with means for preventing danger from the liquid in freezing; a radiator whose cellular composition is equipped at regular or irregular intervals with traps or pockets in which the circulating water traps a quantity of air whose elasticity prevents danger to the delicate tubes of the radiator if the water freezes; and also the invention consists essentially in the construction, arrangement, and combination of the various parts, substantially as will be hereinafter described and claimed.

In the accompanying drawing illustrating my invention:

Figure 1 is a front elevation of my improved automobile radiator with duplex front sections;

Fig. 2 is a conventional front sectional view showing the arrangement of the duplicate sections when the central and outer vertical water channels have one certain form;

Fig. 3 is a similar front conventional sectional view when the water channels are of a different form;

Fig. 4 is an enlarged sectional detail of a portion of the cellular structure belonging to that form of the invention indicated in Fig. 2;

Fig. 5 is an enlarged sectional detail illustrating a portion of the structure represented in the form of the invention shown in Fig. 3;

Fig. 6 is a still greater enlarged fragment of the structure where the air tubes are square in cross-section, and illustrates the means by which the air is trapped by the water in air pockets;

Fig. 7 is an outside view showing the edges of the same and the way they are united together;

Fig. 8 is a cross-section on the line 8, 8 of Fig. 6;

Fig. 9 is a cross-section on the line 9, 9 of Fig. 6;

Fig. 10 is a partial perspective view showing the way in which the material is bent to form the air tubes and water passages; and indicating particularly the closed ends of the water passages;

Fig. 11 is an enlarged detail section similar to Fig. 6 of a fragment of the cellular structure showing modified air and water passages, the air tubes being hexagonal in cross-section, and there being modified forms of the air pockets, the water passages being indicated as zigzagging across the structure;

Fig. 12 illustrates another modification in the shape of some of the passages with the zigzag water passages and with a modified form of air tube and trap;

Fig. 13 is a vertical section on the line 13, 13 of Fig. 1.

Similar characters of reference designate corresponding parts throughout the different figures of the drawing.

1 designates the front of the radiator casing, which may have any suitable general outline or configuration, but is preferably shaped with a pair of openings 2, 2, at the base of which is the horizontal bottom portion 3, and between which is the vertical division 4, while at the outside are the vertical members 5 which are parallel to the central member 4.

In these openings 2 are arranged the ends of two similar or duplicate cellular or tube sections 6, 6 consisting of a multiplicity of parallel horizontal tubular forms made of suitably bent strips of metal and having any desired cross-section and permitting the passage of air through them from front to rear and rear to front with a perfectly free air circulation at all times. The walls of these cells, tubes, or passages have a cooling liquid flowing by them in some suitable way and through convenient passages which are susceptible of a wide modification in arrangement and design, several forms being shown by the different figures of the drawing, and which I shall proceed presently to explain. Water is introduced into the radiator in the usual manner through the filling tube 7 having a cap 8, and any ordinary kind of overflow, as pipe 9, may be employed in connection with the filler. I am not confined to the manufacturing of these parts in any particular way or with any particular shape or size for the whole, since the radiator substantially consists of two groups of tubes which are carried by the main radiator casing and gives a genuine twin honeycomb radiator in service as well as in appearance. The water space within casing 1 connects with the motor by any desired means so as to provide for water circulation, as for example by a top hose connection at 31 and a bottom hose connection at 32.

In Fig. 2 I show the twin groups $6^a$, $6^a$ having a main water space 10 in casing 1 above them, a middle V-shaped passage 11 which converges downwardly between them to the bottom water space 12, and the outer V-shaped or angular vertical passages 13 which converge upwardly alongside of the outer members 5 from the bottom space 12 to the top space 10; so that the water from space 10 flows downwardly at the center and sides and then flows out toward the side or sides to the motor. This is clearly portrayed in Fig. 2 in conventional outline, and in Fig. 4 where the details are brought out more clearly. Also, it will be seen that the similar groups $6^a$, $6^a$ have diagonal passages 14, running from the central V-shaped passage 11 to the outer angular passages 13, so that water circulation takes place quickly along these downwardly-inclined passages 14. The largest or widest part of the central passage 11 is at the top where there is the largest amount of water to flow into the greatest number of tubes 14 to receive this water, and the size of passage 11 decreases as the number of water passages to receive the water decreases toward the bottom of the radiator. The same thing is true of the outer V-shaped passages 13. They are the largest near their lower ends where the greatest amount of water is delivered through tubes 14, this being necessary to take care of the quantity of water. In Fig. 4 it is seen that these passages 14 are on each side straight and are in groups whose members are parallel to each other; and at intervals said passages are provided with right angled extensions which form pockets 15, wherein the water that flows through the passages 14 will trap the air and thus prevent rupture of the parts if any freezing of the water occurs. These pockets are so formed by bending the metal as to extend from one passage 14 to the next adjacent passage 14, and in this manner the horizontal transverse tubes 16 make the cellular structure of which the banks or nests $6^a$ of tubes are formed, said tubes in the present example being shown as square in cross-section, all as clearly indicated in Fig. 4. In this particular form of radiator where the main body of hot water is directly in the center, as in the V-shaped passage 11, a greater cooling effect is produced, and this is better adapted for that construction of motor and fan where the air is drawn in by means of a fan located immediately behind the radiator.

In Figs. 3 and 5 the construction is varied so as to provide a different course in the circulation of the water, the variation consisting in having the duplex banks or nests $6^b$, $6^b$ separated centrally by a vertical median passage 17 which is of an inverted V-shaped form, the convergence of the same being toward the top, instead of toward the bottom as in Fig. 2. At the outside of the banks or nests $6^b$, contiguous to the members 5 are the outside vertical passages 18 which are angular or V-shaped and convergent toward the bottom. There is as before the upper water space 10 immediately below the filling tube 7 and the bottom water space 12 below the banks or nests of tubes $6^b$. In the space 10 is a baffle plate or distributer 19, consisting of oppositely-inclined members below the filling tube 7 which extend more or less over the nests $6^b$, so that the water whenever it is introduced into the radiator will pass outwardly in both directions over the duplex banks or nests $6^b$ and be directed into the outside passages 18 through which it will flow downwardly. These passages 18 as stated are largest in cross-section near the top where they receive the greatest quantity of water. And the water flows from the outer passages 18 through the diagonal passages 20 toward and into the central inverted V-shaped water space 17, and thence to the bottom space 12. As the largest number of tubes 20 deliver into passage 17 as the lower end is approached said passage is graduated in size to increase toward the bottom so as to take care of the greatest amount of water there. The arrangement of the diagonal channels 20 is clearly shown in Figs. 5 and 6. As is the case with the V-shaped downwardly converging passage 11 in the form of the invention shown in Figs. 2 and 4, so with the upwardly converging central space 17, it will be noted that the middle space, as also the outer water spaces, always widens out to correspond with the number of tubes that are discharging water into them. While the space 17 at the top where only a few of the passages 20 discharge thereinto is smaller in cross-section, it will be seen that it widens out toward the bottom to accommodate the additional quantity flowing thereinto through the greater number of tubes. So also, as stated, the passages 20 which run in a direction opposite to that of the passages 14 will discharge downwardly into the central passage 17 and there will be more water near the bottom than at the top. In the honeycomb or cellular construction shown in Figs. 3, 5, and 6, it will be seen that I utilize the same air trapping methods as are shown and explained in Figs. 2 and 4, the channels 20 being formed with right-angled extensions 21 in which the air is trapped when the water flows through the passages 20. It will be noted that the horizontal air passages 22 which make up the honeycombs of the sections 6ᵇ, 6ᵇ are, therefore, entirely surrounded by water in like manner as the tubes 16 in the other construction shown in Figs. 2 and 4.

It will be observed that in all the different forms shown in Figs. 2, 3, 4, and 5, as also in any other forms where a duplex panel formation of tubes is employed, it is found desirable to fill the water spaces and passages, as 10, 11, 12, 13, 17 and 18 with inverted V-shaped pockets which consist of angle pieces that reach across from the front to the rear walls of the radiator and are held by the frame thereof in any suitable way. These angle pieces 23 are preferably very numerous and are located close to each other throughout all the spaces and passages mentioned, or elsewhere, and are usually arranged with the point of their V-form toward the flow of the water so that the water will impinge thereon and split and be divided, the result being in every case that more or less air will be trapped under and within the cavity of the V-shape so that throughout all the spaces and passages I provide small catch devices, traps, or pockets of a V-shape, or similar shape designed to entrap a small amount of air at a multiplicity of points when the water flows around them, and, therefore, the rupture or breakage of these portions of the radiator is prevented should it happen that the water around them freezes at any time in consequence of a drop of temperature.

There may be a wide variety and diversity in placing and application and support of these devices. They may be held at one or both ends, and will be found to be extremely useful.

In Figs. 2, 3, 4, 5, 6, and 7, I have delineated the horizontal air tubes or passages 16 or 21, as the case may be, as being square in cross-section, and as having certain of their walls providing pockets for entrained air in order to avoid the danger of freezing. It will be noted, however, that I do not wish to be restricted to a square or rectangular shape for these air passages, inasmuch as it is possible for them to be made in any desired shape. In Fig. 11 I have delineated a section of honeycomb or cellular structure where the air passages are hexagonal in shape as at 24 instead of being square or rectangular. Between these hexagonal tubes 24 run zigzag passages 25 instead of straight passages 14 or 20. These passages 25 are provided at certain points with the angular upwardly extending projections 26 which provide pockets to entrap a certain amount of air when the water is flowing through the zigzag passages 25, in order that there may be no rupture of the parts if freezing occurs; and furthermore the passages 25 adjacent to each of the hexagon tubes is provided with a V-shaped recess 27 similar to one of the V-shaped pockets 23 and having the function of receiving and retaining a certain amount of air when the water flows through the passages 25. The zigzag passages, therefore, formed by the shape of tubes that are polygonal in cross-section will be found to convey the water very efficiently in the circulatory system of the radiator; but zigzag passages are not essential for many-sided tubes, that is to say, tubes having more than four sides, and it is possible to use them with square, rectangular, or round tubes. An example of zigzag passages, as 28, with square tubes 29 is indicated in Fig. 12, in which case the inverted V-shaped pockets 30 for entrapping air whose elasticity compensates for the freezing action to prevent injury, is shown, and it will be seen that the walls of the tubes 29 are put together in a different way from what they are in Figs. 4 and 5 in order that the zigzag course for the water between the outside and the center spaces of the main casing 1 between the duplex nests of tubes may be provided.

I have said that the form of the invention delineated in Figs. 2 and 4 has a special adaptation to the case where the air is drawn in by a fan located immediately behind the radiator. I should also state that the form of the invention represented in Figs. 3 and 5 is specially adaptable to a motor where the fan is constructed in the fly wheel of the motor and the air is drawn in more at the sides through the honeycomb, the water or liquid being in this case, as I have shown, distributed by a splash over the duplex honeycombs so as to bring the hot fluid first into the outer channels from which it will run from the center passage and down into the outlet.

In Figs. 7 and 10 I show clearly how the metal is bent to form the water passages between the air tubes. Any efficient bending machine may be used for this purpose. Take for example, a sheet of metal which at intervals can be bent at right angles to form the air pockets as shown, between which air pockets are the rectangular or other shaped air tubes or passages, as for example, that delineated at 16, or the hexagonal or polygonal forms; then a single sheet as 35 is placed below the previous sheet mentioned, and another on the tubes thereof, the edges of said sheets being flanged or crimped at 34 also by means of some suitable bending machine, the ends of the water passages at 33 will be slightly offset, the parts can all then be shaped together by suitable mechanical means and immersed in a soldering vat or other appliance for causing the parts which have been previously bent into the proper shape to be securely fastened together. These plates of metal or similar material which are thus properly bent for the purpose of making up the radiator honeycombs may moreover be united by soldering or otherwise along any predetermined lines and at any necessary points so that the tubes may be formed and the water passages provided in the right way.

The construction of a honeycomb in two sections of cores permits a much more simplified method of producing a V-shaped radiator of a genuine honeycomb type, for instead of building a V-shaped core in one piece where tubes have been built up individually and offset gradually to form the desired shape, I construct my honeycomb in two half sections, either of which can be readily removed for the sake of repairs, and, therefore, the cost is greatly reduced whenever a section has to be replaced.

Referring generally to the shape of the middle water passages 11 and 17 and the outside passages 13 and 18 it will be observed that one of the passages 13 is equal to half of the passage 11, and one of the passages 18 is correspondingly equal to half of the passage 17, but this is merely a suggestion, and I do not wish to be restricted thereto. The air which is entrained in the pockets 15, 21, 26, 27, 30, 23 and any other similar pocket designed to receive it, will remain so trapped for an indefinite length of time and as a matter of actual fact is not taken up or obliterated by the action of the water; moreover, should the water happen to freeze the expansion of the water results merely in a slight compression of the air so that no harm results to the delicate metal structures surrounding the same. It will be noted moreover that the tubular passages through which the air passes from front to rear and rear to front in the air circulation are separated from the water which surrounds these passages by only a single intervening thickness of metal so that a substantial cooling effect is attained, but it will be seen that I can change the details within considerable limits in order to secure the best results.

Having thus described my invention, what I claim as new and desire to secure by Letters Patent, is:—

1. In a radiator for automobiles and the like, nests or banks of tubes provided with diagonal zigzag passages having projecting air traps consisting of extensions reaching to the next adjoining tube and having V-shaped air-traps.

2. In a radiator for automobiles and the like, a nest of tubes or air passages formed by bending metallic strips at angles at intervals to form air pockets, placing alongside thereof other strips which will form water channels and also air tubes, the ends of the various strips being offset and closed together so as to complete the formation of the water channels and air pockets, the said parts being united into a unitary nested combination.

In testimony whereof I hereunto affix my signature.

LEO KAPPERTZ.